(12) United States Patent  
Gonzalez Alemany et al.

(10) Patent No.: US 8,424,667 B2
(45) Date of Patent: Apr. 23, 2013

(54) MOVING WALKWAY

(75) Inventors: Miguel Angel Gonzalez Alemany, Oviedo (ES); Juan Domingo Gonzalez Pantiga, Gijón (ES); Manuel Alonso Cuello, Gijón (ES)

(73) Assignee: Thyssenkrupp Norte, S.A., Mieres, Asturias (ES)

( * ) Notice: Subject to any disclaimer, the term of this patent is extended or adjusted under 35 U.S.C. 154(b) by 678 days.

(21) Appl. No.: 11/997,107

(22) PCT Filed: Jul. 12, 2006

(86) PCT No.: PCT/ES2006/000399
§ 371 (c)(1),
(2), (4) Date: Aug. 5, 2008

(87) PCT Pub. No.: WO2007/012680
PCT Pub. Date: Feb. 1, 2007

(65) Prior Publication Data
US 2008/0302631 A1 Dec. 11, 2008

(30) Foreign Application Priority Data
Jul. 28, 2005 (ES) ................... 200501854

(51) Int. Cl.
B66B 25/00 (2006.01)
B66B 21/00 (2006.01)
B66B 21/02 (2006.01)
B66B 23/12 (2006.01)
B65G 17/06 (2006.01)
B65G 17/38 (2006.01)

(52) U.S. Cl.
USPC ........... 198/321; 198/327; 198/326; 198/333; 198/853; 198/850; 198/851; 198/852

(58) Field of Classification Search ........................ None
See application file for complete search history.

(56) References Cited

U.S. PATENT DOCUMENTS

| | | | |
|---|---|---|---|
| 3,247,947 A | 4/1966 | Fox et al. | |
| 4,394,901 A | 7/1983 | Roinestad | |
| 5,125,504 A * | 6/1992 | Corlett et al. | 198/850 |
| 5,595,278 A * | 1/1997 | Ostermeier et al. | 198/333 |
| 6,474,464 B1 * | 11/2002 | Horton et al. | 198/853 |
| 6,607,064 B2 | 8/2003 | Inoue | |
| 2002/0116839 A1 | 8/2002 | Johnson | |
| 2003/0116403 A1 | 6/2003 | Fargo et al. | |
| 2007/0029162 A1 * | 2/2007 | Aulanko et al. | 198/333 |

FOREIGN PATENT DOCUMENTS

| | | |
|---|---|---|
| ES | 1030256 | 1/1995 |
| GB | 2 027 659 | 2/1980 |
| WO | WO 00/35786 | 6/2000 |

* cited by examiner

*Primary Examiner* — Gene Crawford
*Assistant Examiner* — Yolanda Jones
(74) *Attorney, Agent, or Firm* — Merchant & Gould P.C.

(57) ABSTRACT

The invention relates to a moving walkway comprising a moving belt (1) formed by a series of pallets (3) consecutively hinged to one another by means of elements (4-5) forming part of the pallets themselves and forms drive means through which the stress of the pulling mechanism is transmitted between pallets (3).

12 Claims, 7 Drawing Sheets

MOVING WALKWAY

FIELD OF THE INVENTION

The present invention relates to a moving walkway, which is made up of a moving belt formed by a series of pallets consecutively hinged to one another according to pins perpendicular to the direction of movement, and which is intended to transport people or materials.

BACKGROUND OF THE INVENTION

Moving walkways with the indicated constitution are already known, generally intended to transport people, although they can also be applied to transporting goods or materials.

A moving belt or walkway including a pallet system formed by several hinged plates with the object of reducing the space in the turnings of the walkway is already known through U.S. Pat. No. 6,607,064. In the described system it is necessary to use additional chains for the traction of the conveyor plates. Furthermore the dimensions of the resulting plates are relatively large, except in the case of increasing the number of supports of the pallet system, which increases the cost.

A conveyor walkway for people with hinged pallets is also known through U.S. Pat. No. 3,247,947, in which the hinge is made at the ends of the pallet, which forces lubrication to be used, which appears on the treadboard area of the pallet, with the consequent risk for the user and the unaesthetic appearance of the walkway over time. Furthermore, the hinge pin is independent in this system, which makes to enormously difficult to assemble and disassemble the pallets once the walkway is installed due to the possible lack of side space for removing the hinge pin.

DESCRIPTION OF THE INVENTION

The object of the present invention is to eliminate the drawbacks set forth by means of a walkway formed by a pallet system providing important improvements regarding the simplicity of the mechanisms compared to conventional moving walkways.

Another object of the invention is to provide a series of improvements intended to increase the safety for the users on the moving walkways.

The walkway of the invention is of the type comprising a moving belt formed by pallets consecutively hinged to one another according to pins perpendicular to the direction of movement, forming a conveyor for people or goods by way of an endless belt.

According to the invention, the hinges between consecutive pallets are formed by means of elements forming part of the pallets themselves and furthermore forming drive means through which the stress of the pulling mechanism of the walkway is transmitted between the pallets.

The elements of the pallets forming the hinges between such pallets consist of a pin running along at least part of one of the longitudinal edges of the pallets and a grooved housing, open at the lower part, running along at least part of the opposite longitudinal edge in coincidence with the pin of the other edge, the grooved housing being sized and placed to house the pin of the opposite edge with freedom of relative rotation between both.

The hinge between consecutive pallets, defined by the mentioned pin and housing, fulfills two functions: it supports the vertical stress allows by the load of the previous or next pallet, and transmits the power of the machine for the longitudinal movement of the plates.

The plates can be formed from a suitable material for ensuring an operation without needing lubrication, although other configurations are possible. By way of example, the plates can be formed with a base made of a suitable plastic material, with inserts for the hinge pin in a metal material, stainless steel for example, and with the support surface for the user in aluminum. The base can also be made of aluminum, using inserts in the hinges in suitable materials to allow the operation without maintenance.

The design of the hinge pin is such that it allows a simple assembly. To that end, in the preferred configuration, the pallet will have a continuous pin on one of its longitudinal edges, whereas on the opposite edge it will have the grooved housing for the pin, with a hook shaped section.

The pin can also be formed by a series of aligned cylindrical sections running along recessed sections that the plates have from one of their longitudinal edges. Portions with an identical size project out opposing these recesses on the opposite edge, which portions form from the lower surface the grooved housings aligned with one another in order to receive the different pin sections, with freedom of rotation between both.

With this constitution, the pallets have connectable and alternated projecting and recessed longitudinal edges, such that the grooved housings of one of the longitudinal edges fits in correctly with the pin sections of the opposing edge of the next pallet.

Both the pin and the housings will have a circular section, although the pin can include one or more sections having on their side surfaces two diametrically opposite and parallel longitudinal planar facets determining a reduction in diameter. The grooved housings in turn have a partially constricted longitudinal outlet with a width approximately equal to the distance between the two mentioned planar facets of the pins. The pallets thus only have an assembly and disassembly position between one another, which can be achieved during installation and maintenance operations, in which the narrowing of the pins, defined by the planar facets, can be opposed to the outlet of the grooved housings, whereas during the operation this narrowing will oppose the outlet of the housings.

If necessary the longitudinal outlet of the grooved housings can be closed by means of a removable lid preventing dirt from entering the hinges.

Other configurations are possible: for example, they can be joined with an additional part, ensuring the safety of the joint in any part of the mechanism, in addition to disassembling the belt in the areas or sections in which it is necessary.

A bushing intended to prevent the wear of the pin and housing can also be arranged between the sections defining the hinge pin between the pallets and the grooved housings for said sections. This bushing can be longitudinally open in order to facilitate assembling the pin. The bushing will further have a surface complementary to that of the pin or housing such that the rotation of said bushing is prevented.

According to a preferred configuration the pallets are supported on the structure of the walkway through freely rotating wheels, with a pin parallel to the hinge pin between pallets. These wheels can be assembled on the transverse edges of the pallets in coincidence with the hinge pin between pallets. The freely rotating wheels will be guided along the entire walkway and will form the support of the belt on the structure thereof.

Other alternative configurations are possible. For example, the rollers may not be incorporated in the belt, but rather they are fixed to the structure of the walkway, supporting the pallet belt on these rollers along the entire rolling path. Instead of using rollers, it would also be possible to support the pallet belt in loose bands made of suitable material. It is likewise possible to use sliding guides instead of rollers or support straps or a mixture of the different systems.

The traction of the belt can be carried out in different ways: for example, it is possible to use a traditional system with gear wheels at one end of the walkway, meshing with the rollers of the pallet belt. It is also possible to arrange elements with a suitable geometry in the pallets, meshing with wheels in which the combined profiles are cut. Linear traction systems are likewise possible, meshing the outer part of the pallets with elements with a suitable geometry.

In addition, each two consecutive pallets can be connected by side plates allowing the relative rotation between plates but preventing their separation. These lateral plates connecting two consecutive pallets can be fixed to the transverse edges of one of the pallets and to the hinge pin between said pallets belonging to the second pallet.

These plates can have raised side edges, which will be used to delimit the area in which the user remains, carrying out the functions which the base traditionally carries out in these types of mechanisms.

With the described constitution, there is a moving walkway having the following advantages:
Reduced costs due to the elimination of the traction chains and to the reduction of the material necessary for giving strength to the plates, due to the support thereof along the entire length.
Increase of the user's safety, as the plate incorporates the side edges delimiting the space for the user.
A lighter pallet and consequently a reduction of the power consumed for moving the mechanism.
Reduction of the necessary dimensions for installing a walkway due to the smaller height of the pallets.
Reduction of the maintenance costs as hinges without lubrication and which can be removed without needing tools are used.

BRIEF DESCRIPTION OF THE DRAWINGS

The features and advantages of the invention can be better understood in the following description made with reference to the attached drawings in which a non-limiting embodiment is shown. In the drawings.

DETAILED DESCRIPTION OF THE EMBODIMENT

Figure 1:
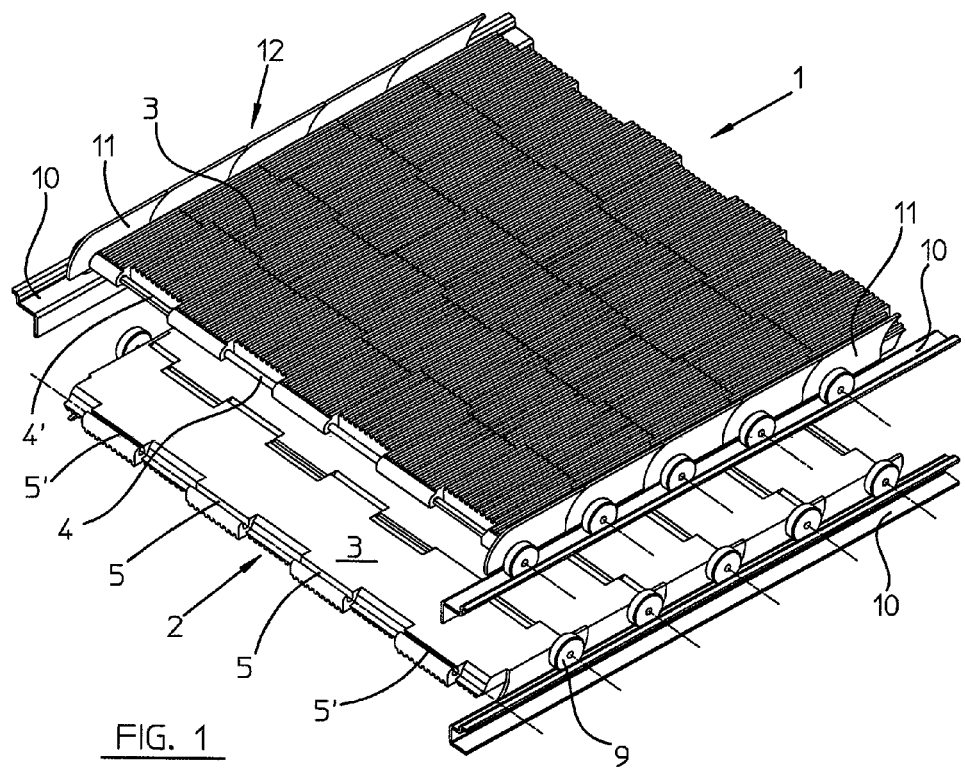
FIG. 1 is a partial perspective view of the moving belt of a moving walkway, formed according to the invention.
Figure 2:
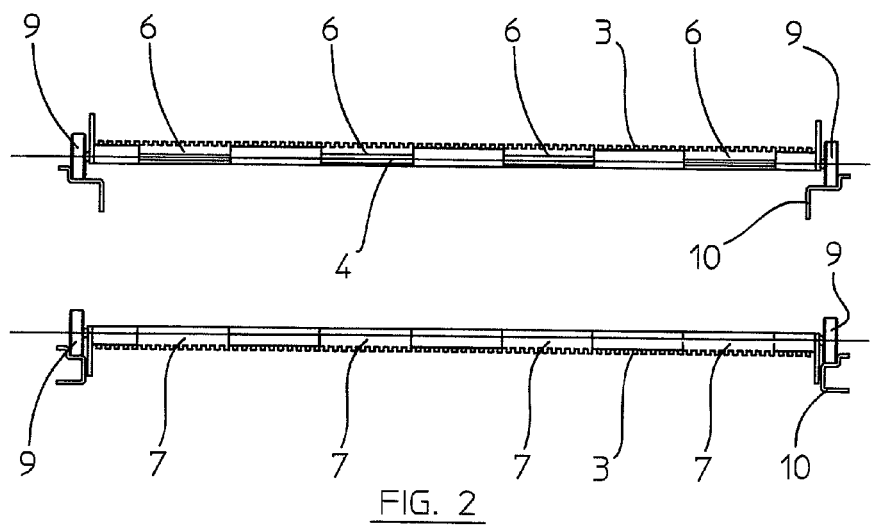
FIG. 2 shows a front elevational view of the portion of the belt represented in FIG. 1.

FIG. 1 shows a partial perspective view of the forward movement 1 and return 2 section of the belt of a moving walkway, which is formed by means of pallets 3 which are consecutively hinged by means of elements forming part of the pallets themselves. These elements defining the hinge between every two consecutive pallets are formed by a pin 4 running along at least part of one of the longitudinal edges of the pallets 3, and a grooved housing 5, open toward the lower surface of the pallets 1, running along at least part of the opposite longitudinal edge in coincidence with the pin sections or portions 4, these grooved housings 5 being sized and placed to house the pin sections or portions 4 with freedom of relative rotation between both.

Figure 3:
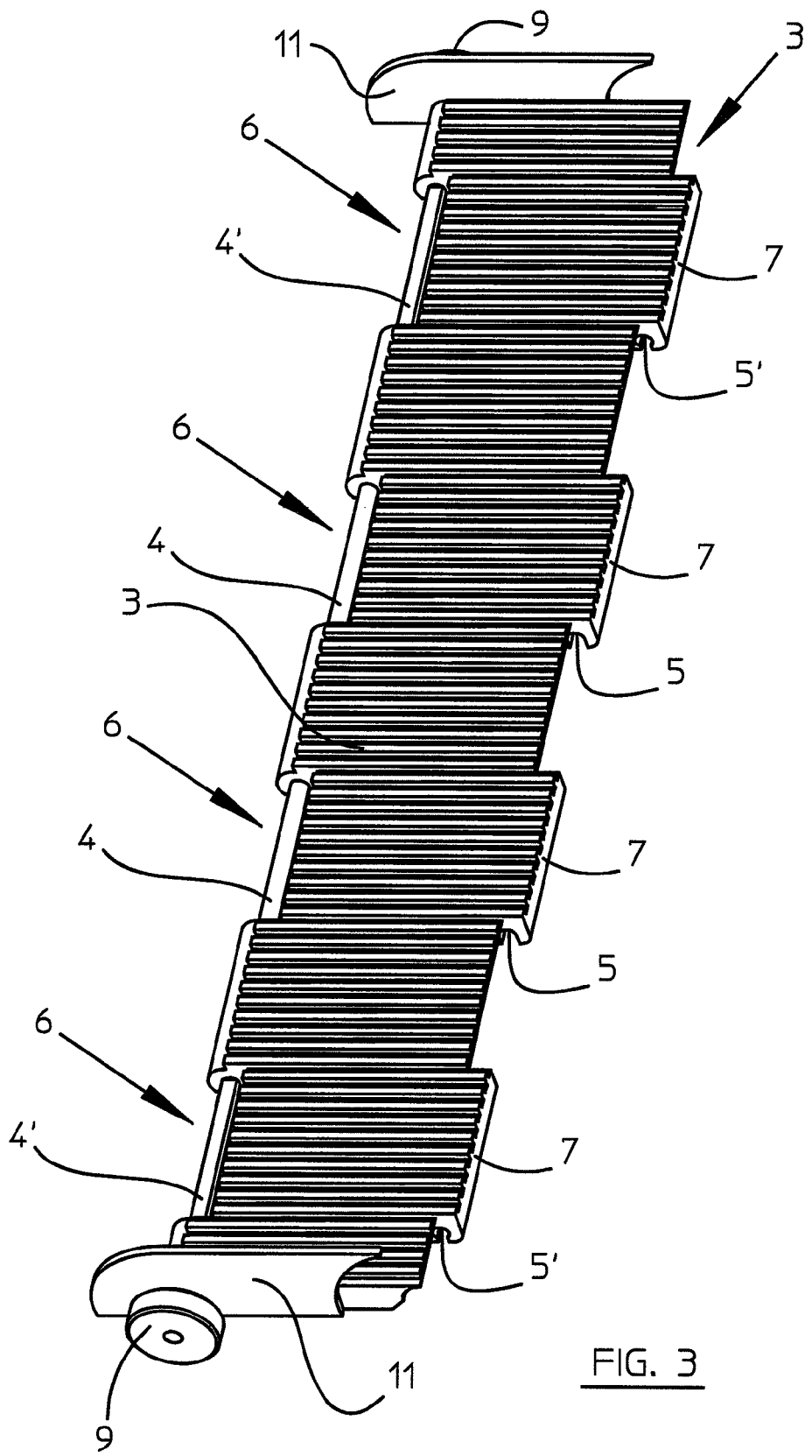
FIG. 3 is a perspective view of one of the pallets forming part of the belt of the moving walkway.

FIG. 3 shows a perspective view of one of the pallets 3, which has along one of its longitudinal edges recessed portions 6 which are longitudinally traversed by the pin portions 4. From the opposite edge the pallet 3 has projecting sections 7 in coincidence with the recessed sections 6 of the opposite edge. The grooved housings 5 are formed from the lower surface of the pallet 3 in these projecting sections 7.

The hinges between consecutive pallets are further used as drive means through which the stress of the pulling mechanism is transmitted between pallets, the belt thus configuring a chain responsible for transmitting the traction along the walkway, without needing to use auxiliary traction chains.

Furthermore the hinges formed with the pin sections 4 and grooved housings 5 allow easily assembling and disassembly the pallets 3 in addition to supporting the transmission stress of the movement of the walkway. Each pallet 3 can further include freely rotating wheels or rollers 9 at its transverse edges, for example in coincidence with the pins 6, through which the pallets 3 will be supported on guides 10 forming part of the structure of the walkway, both in the forward movement section 1 of the belt and in the return section 2.

As can be better observed in FIG. 3, the pallets 3 can further have at their transverse edges plates 11 which will delimit the space available for the user, upon forming a longitudinal frieze 12 along the belt, such as can be observed in FIG. 1.

The pallets 3 can be manufactured from a suitable material allowing an operation without lubrication, adding the pins 4 of a suitable material, stainless steel for example, and coating the inner surface of the grooved housings 5 with a technical material with low friction and high resistance to wear.

Figure 4:
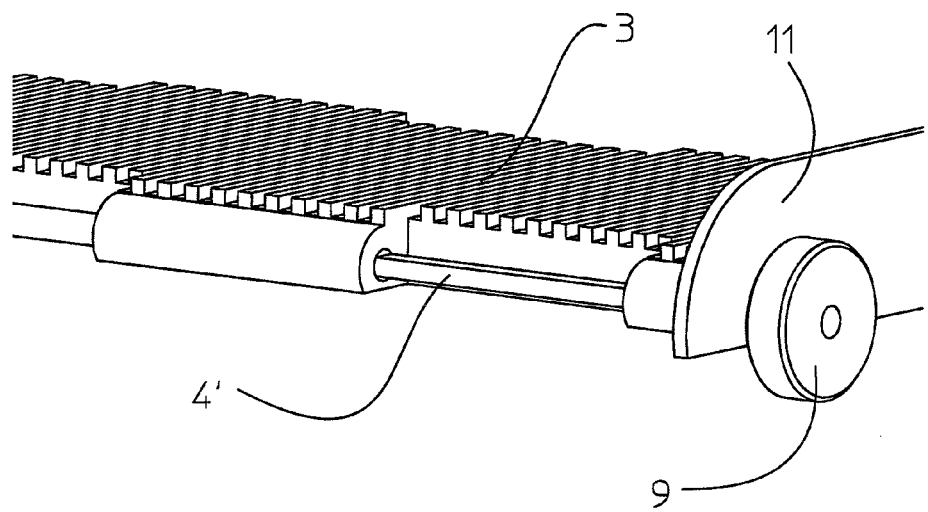
FIG. 4 is a perspective detailed view of one of the pin sections of the pallets including the two diametrically opposite longitudinal facets.
Figure 5:
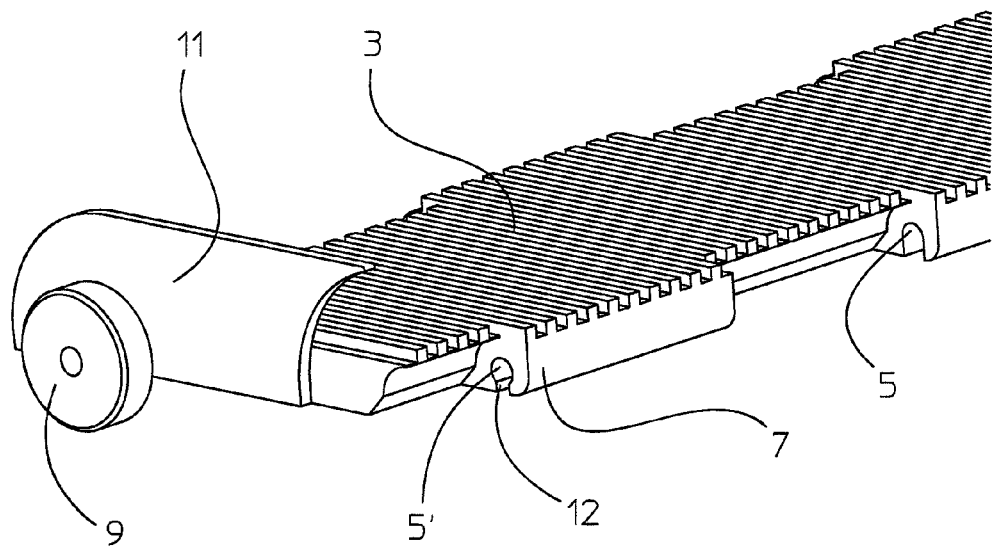
FIG. 5 is a perspective detailed view of one of the grooved housings included by the pallets on the opposite edge for the hinge pins.

According to FIG. 4, certain pin sections 6, for example the end sections with reference number 4', can have two diametrically opposite longitudinal planar facets, determining a reduction in diameter in the corresponding pin. The grooved housings which will receive these pin sections 4', FIG. 5, have in turn a partially constricted longitudinal outlet 12 with a width approximately equal to the distance between the planar facets of the pin sections 4'.

With this constitution, the pin sections 4' can be introduced and removed from the grooved housings 5' when the longitudinal planar facets are directed towards the outlet 12, whereas in the opposite case, which will correspond to the operation of the belt, said pin sections 4' will be prevented from coming out of the grooved housings 5.

Figure 6:
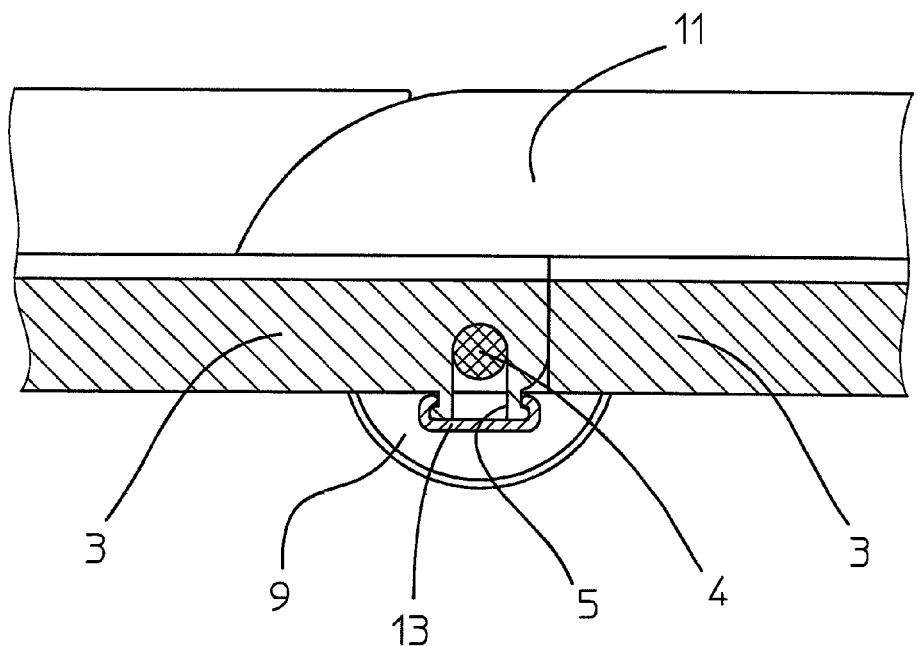
FIG. 6 is a partial longitudinal section of the moving belt showing the hinge between two consecutive pallets.

In any case, the grooved housings 5 can further be closed, as shown in FIG. 6, by means of a removable plate 13 preventing dirt from entering the hinges.

Figure 7:
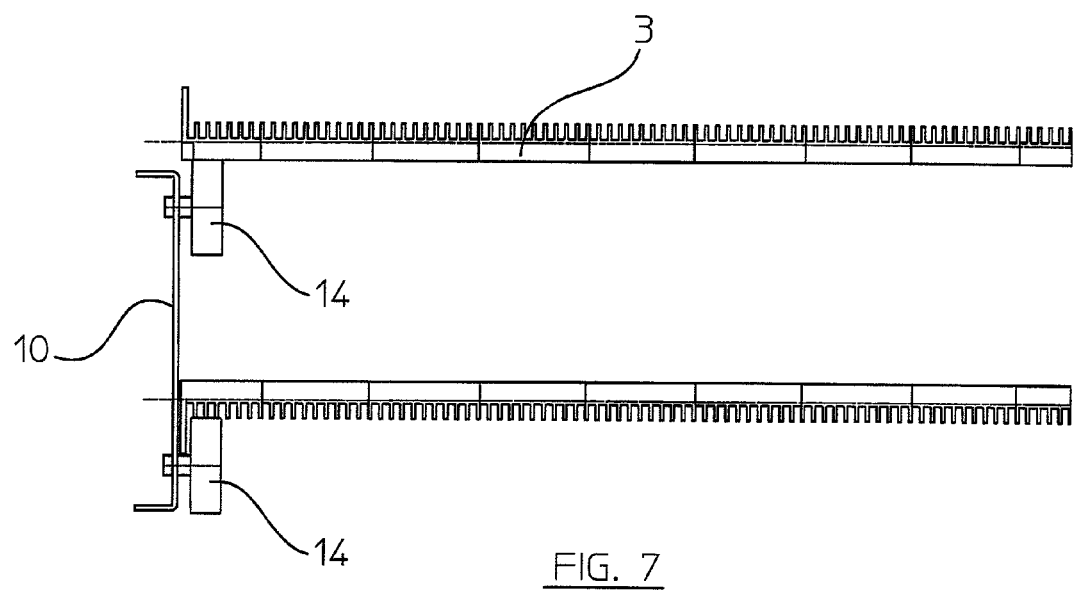
FIGS. 7 and 8 are views similar to FIG. 2, showing other implementation variants.
Figure 8:
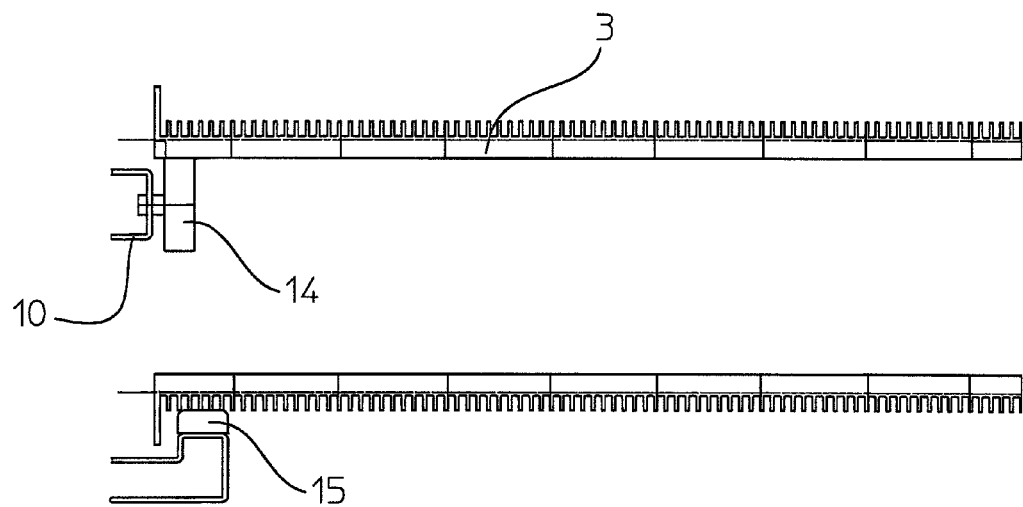
Figure 9:
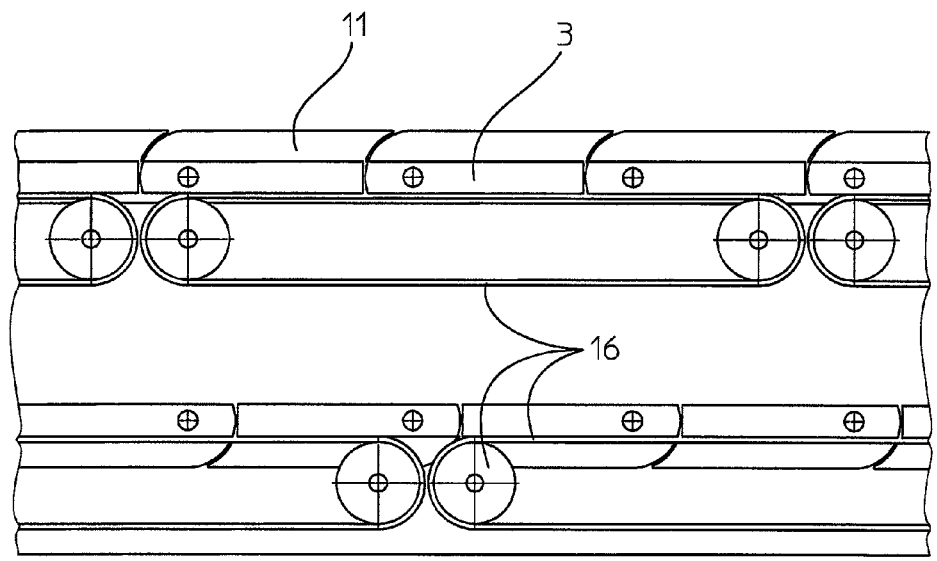
FIG. 9 is a longitudinal section of the moving belt of the walkway, with rollers and bands for supports on the structure thereof.

FIGS. 7, 8 and 9 shows as many other implementation variants, in which the pallets 3 are supported on rollers 14, sliding belts 15 or loose bands 16 which are fixed to the structure of the walkway and are therefore independent of the pallets 3.

Figure 10:
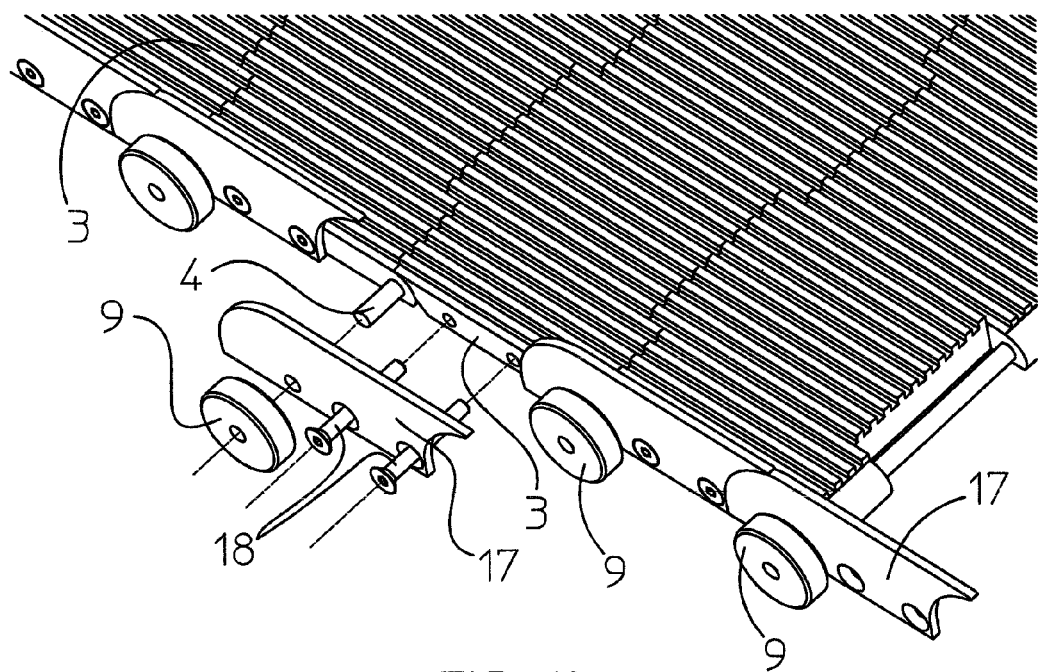
FIG. 10 is a perspective view of the assembly of pallets incorporating an additional part in order to prevent it from coming out of its position in the return.

Another possible embodiment is shown in FIG. 10. In this case, the pallets would be prevented from coming out of their position in the returns by means of additional parts 17 which are fixed to the pallets 3 by means of screws or rivets 18, for example, and are hinged with the pin 4 of the next pallet 3. The pallets thus do not come out of their position in the return section because they are supported, in addition to on their own pin, on the pin of the next pallet through this additional part 17, which can in turn substitute the base of the walkway and can be made from a different material than the pallets.

Figure 11:
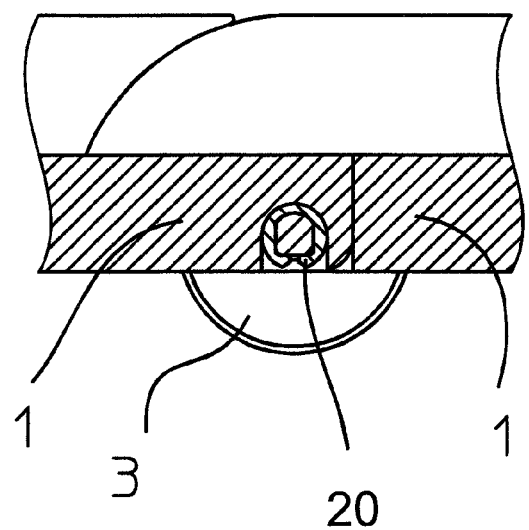
FIG. 11 is a section similar to FIG. 6, showing an implementation variant.

FIG. 11 shows a configuration of the hinge between consecutive pallets, according to which a bushing 20 is arranged between the pin portions 4 and the grooved housings 5, which bushing is made of a material suitable for preventing the wear of said pin and housing. This bushing is longitudinally open to facilitate its assembly and it can be directly fixed in the pin 4 or housing 5. The bushing 20 and pin 4 or housing 5 will further have complementary opposing surfaces preventing the rotation of said bushing. In the depicted example, the pin 4 and bushing 20 have complementary planar surfaces 4' preventing the rotation of the bushing.

Figure 12:
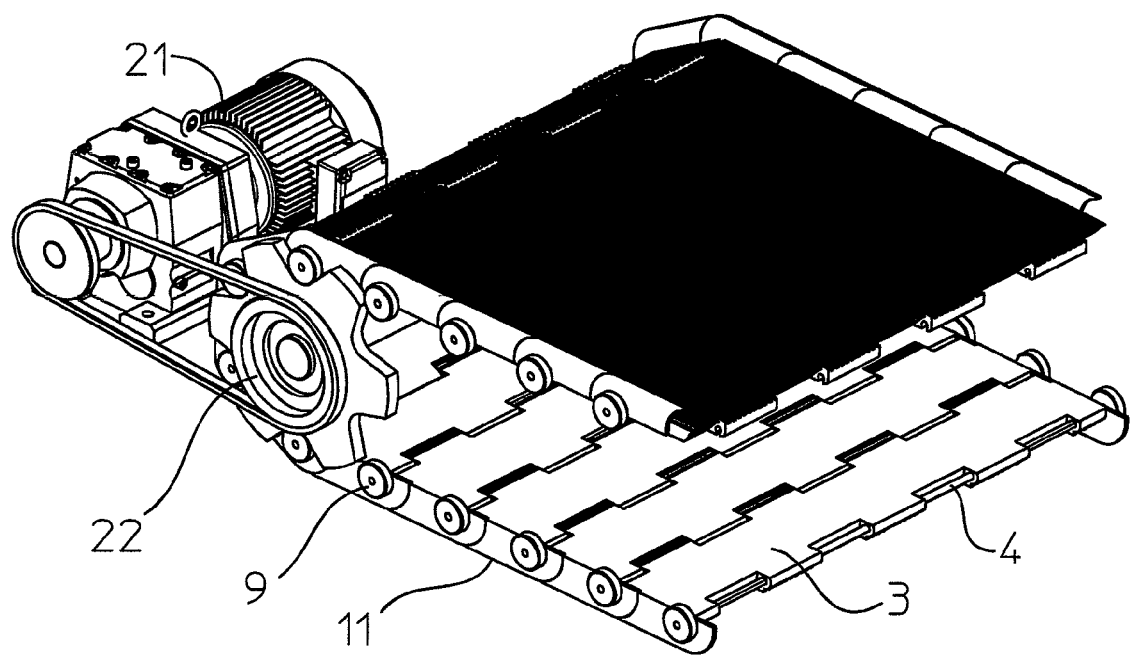
FIG. 12 shows a perspective view of a possible mechanism for actuating the moving belt.

FIG. 12 shows, by way of example, a possible mechanism for actuating the belt from a motor 21 actuating the gear wheel 22 with which the wheels or rollers 9 of the pallets 3 mesh.

The invention claimed is:

1. A moving walkway comprising a moving belt formed by a series of pallets having longitudinal edges and hinges connecting consecutive adjacent pallets with pins extending perpendicular to a direction of movement, wherein the hinges between the pallets are formed by elements forming a part of the pallets, the elements forming drive means through which stress of a pulling mechanism is transmitted between pallets;
   wherein the elements of the pallets forming the hinges therebetween comprise a pin running along at least part of one of the longitudinal edges of the pallets and a grooved housing open at a lower part, running along at least part of the opposite longitudinal edge in coincidence with the pin of the other edge, and sized and located to house said pin, with freedom of relative rotation between the pallets; and
   wherein the pallets include recessed sections along the longitudinal edges, and wherein the pin is formed by a series of aligned cylindrical sections extending along the recessed sections, opposite to which portions extend having an identical size, forming from a lower surface aligned and grooved housings to receive different pin sections, with freedom of rotation between the pallets.

2. A walkway according to claim 1, wherein the pin and grooved housings have a circular section.

3. A walkway according to claim 1, wherein the section or sections defining the pin are formed based on a material different from that of the pallet and are fixed to said pallet.

4. A walkway according to claim 1, comprising a structure on which the pallets are assembled and can move, wherein the pallets are supported on the structure through freely rotating wheels, with a pin parallel to the hinge pin between pallets.

5. A walkway according to claim 4, wherein the wheels are assembled at the transverse edges of the pallets, with the pin thereof in coincidence with the hinge pin between pallets.

6. A walkway according to claim 4, wherein the freely rotating wheels are assembled in the structure of the walkway.

7. A walkway according to claim 1, comprising a structure on which the pallets are assembled and can move, wherein the pallets are supported on the structure through elements which can move in a direction parallel to the direction of movement of the pallets.

8. A moving walkway comprising a moving belt formed by a series of pallets having longitudinal edges and hinges connecting consecutive adjacent pallets with pins extending perpendicular to a direction of movement, wherein the hinges between the pallets are formed by elements forming part of the pallets, the elements forming drive means through which stress of a pulling mechanism is transmitted between pallets;
   wherein the elements of the pallets forming the hinges therebetween comprise a pin running along at least part of one of the longitudinal edges of the pallets and a grooved housing open at a lower part, running along at least part of the opposite longitudinal edge in coincidence with the pin of the other edge, and sized and located to house said pin, with freedom of relative rotation between the pallets;
   wherein the pin has one or more sections having on a side surface two diametrically opposite and parallel longitudinal planar facets determining a reduction in diameter, and wherein the grooved housings have a partially constricted longitudinal outlet with a width approximately equal to a distance between the planar facets.

9. A moving walkway comprising a moving belt formed by a series of pallets having longitudinal edges and hinges connecting consecutive adjacent pallets with pins extending perpendicular to a direction of movement, wherein the hinges between the pallets are formed by elements forming part of the pallets, the elements forming drive means through which stress of a pulling mechanism is transmitted between pallets;
   wherein the elements of the pallets forming the hinges therebetween comprise a pin running along at least part of one of the longitudinal edges of the pallets and a grooved housing open at a lower part, running along at least part of the opposite longitudinal edge in coincidence with the pin of the other edge, and sized and located to house said pin, with freedom of relative rotation between the pallets;
   wherein an opening of the grooved housings is closed by a removable lid.

10. A moving walkway comprising a moving belt formed by a series of pallets and hinges connecting consecutive adjacent pallets with pins extending perpendicular to a direction of movement, wherein the hinges between the pallets are formed by elements forming part of the pallets, the elements forming drive means through which stress of a pulling mechanism is transmitted between pallets;
    wherein two consecutive pallets are connected by side plates allowing relative rotation between the side plates but preventing their separation;
    wherein the side plates connecting two consecutive pallets are fixed to transverse edges of one of the pallets by screws or bolts and to the hinge pin between said pallets of a second one of the pallets.

11. A moving walkway comprising a moving belt formed by a series of pallets and hinges connecting consecutive adjacent pallets having longitudinal edges with pins extending perpendicular to a direction of movement, wherein the hinges between the pallets are formed by elements forming part of the pallets, the elements forming drive means through which stress of a pulling mechanism is transmitted between pallets;

wherein the elements of the pallets forming the hinges therebetween comprise a pin running along at least part of one of the longitudinal edges of the pallets and a grooved housing open at a lower part, running along at least part of the opposite longitudinal edge in coincidence with the pin of the other edge, and sized and located to house said pin, with freedom of relative rotation between the pallets;

wherein a bushing is arranged between the pin and the housing forming the hinges between pallets; and wherein the bushing and the pin or grooved housing have complementary surfaces preventing the rotation of said bushing.

12. A walkway according to claim 11, wherein the bushing is longitudinally open.

* * * * *